United States Patent [19]
Sundstrom et al.

[11] Patent Number: 5,405,236
[45] Date of Patent: Apr. 11, 1995

[54] APPARATUS FOR LIFTING AND MOVING AN ARTICLE

[75] Inventors: Robert D. Sundstrom, Gilbert; Robert L. Thomas, Virginia, both of Minn.

[73] Assignee: Nor-Tech B.S.M.I., Inc., Virginia, Minn.

[21] Appl. No.: 202,407

[22] Filed: Feb. 25, 1994

[51] Int. Cl.$^6$ .............................. B66F 9/00; B60P 1/00
[52] U.S. Cl. ................................... 414/495; 254/10 C
[58] Field of Search ............. 414/495, 786; 254/10 C, 254/10 R, 9 C, 9 R, 8 R, 2 C, 2 R

[56] References Cited

U.S. PATENT DOCUMENTS

| | | | |
|---|---|---|---|
| 309,121 | 12/1884 | Arnold | 254/10 C |
| 623,669 | 4/1899 | Hooper, Sr. | 254/10 C |
| 770,152 | 9/1904 | Bechtel . | |
| 864,902 | 9/1907 | Moore | 254/10 C |
| 865,987 | 9/1907 | Barlow | 254/10 C |
| 914,245 | 3/1909 | Cottrell | 254/10 C |
| 940,565 | 11/1909 | Temple | 254/10 C |
| 1,129,775 | 2/1915 | Anthony . | |
| 1,827,692 | 10/1931 | Vik . | |
| 2,224,166 | 12/1940 | Stuebing, Jr. | 254/10 C |
| 2,356,913 | 8/1944 | Berman . | |
| 2,513,440 | 7/1950 | Alderson . | |
| 2,959,311 | 11/1960 | Rosenow | 414/495 |
| 3,809,268 | 5/1974 | Lutz | 414/495 |
| 4,085,953 | 4/1978 | Farwell | 254/10 C |
| 4,245,657 | 1/1981 | Jordan et al. | 254/10 C |
| 4,331,324 | 5/1982 | Andary . | |
| 5,125,626 | 6/1992 | Lonsway et al. . | |

*Primary Examiner*—Michael S. Huppert
*Assistant Examiner*—James Eller
*Attorney, Agent, or Firm*—Merchant, Gould Smith, Edell, Welter & Schmidt

[57] ABSTRACT

The present invention is an apparatus that can be operated by one person to move an article such as a pool table, vending machine, and the like, from place to place over a floor surface. The apparatus is made of a planar base and planar platform with a structure for slidably moving the apparatus across the floor. The apparatus includes a mechanism for pivotally connecting the base and platform attached at opposing sides of the apparatus. The pivotal connecting mechanism is operable to raise and lower the platform relative the base to selectively move the apparatus between a retracted position and an elevated position. The invention further provides a method of moving an article using the apparatus. In use, an operator positions the apparatus in the retracted position underneath the article and pushes downward on the handle of the movement actuating structure to elevate the platform which then contacts the article and raises it off the floor. The article is then moved to a new location, and the platform lowered to place the article onto the floor.

12 Claims, 9 Drawing Sheets

APPARATUS FOR LIFTING AND MOVING AN ARTICLE

FIELD OF THE INVENTION

This invention relates generally to an apparatus for lifting and moving a large, heavy object such as a pool table, vending machine, pinball game table, and the like, across a floor surface.

BACKGROUND OF THE INVENTION

Large articles such as pool tables, air hockey tables, football tables, vending machines and the like, are often provided in commercial establishments. These articles must be moved from time to time, for example, when cleaning, recarpeting or refinishing a floor, rearranging the room or remodeling the establishment. These articles are large, heavy and rather awkward to move. However, it is often impractical and costly to hire professional movers to move such articles.

Oftentimes, pool tables and other large articles are moved by a number of persons who are positioned at the corners and sides of the article and then manually lift and move the article to a desired location. There is a danger, however, that the article may be tipped or dropped during moving, resulting in damage to the article as well as the floor. Additionally, a person may become injured due to the weight of the article and their general lack of skill in moving such large articles.

In an attempt to overcome such drawbacks, dollies have been developed for moving various types of articles and furniture. One such device is a furniture dolly made of a steel or wood frame approximately two feet square and four inches high, with casters at each corner of the frame. To move an article such as a pool table using that device, two or more people tip the pool table onto its side, place the table onto the dolly, and roll the table to a new location. The table would then be tipped back onto its legs into a normal standing position.

A drawback of that device is that several people are needed to tip the article onto its side and place it onto the dolly. With a pool table, if proper care is not taken during tipping, the article may be accidentally dropped and damaged. Also, if the table is tipped at too sharp an angle, the feet of the table may become damaged and/or the level of the slate may become altered.

Other devices have been described for moving large articles that eliminate the need for tipping the article to place it on the dolly. One such device is made with a hydraulic jack welded at its base to a steel plate with casters attached to the bottom surface for rolling the device across a floor. At its other end, the jack is welded to a steel plate for contacting and lifting an article such as a pool table. In use, the device is placed under the table, the jack is actuated to vertically raise and lift the table off the ground, and the table is then rolled to its desired location. There, the jack is again actuated to vertically lower the table onto the floor, and the dolly is then removed. A dolly of this type is described, for example, in U.S. Pat. No. 4,331,324 for moving a pinball game table.

A drawback of this device is the instability of the article during movement. Several people are needed to balance the article on the contacting plate and maintain the article in that position during the move. Another drawback is that oftentimes a person must position himself under the table or other article to manually actuate the jack for contacting the plate with the article and raising the article above the floor. This lends itself to the risk of injury to the person. Also, if a hydraulic jack is used, there may be leakage of hydraulic fluid that may cause damage to floors and/or create a safety hazard for slipping.

U.S. Pat. No. 5,125,626 describes a dolly for moving a pool table that may be operated by one person. The dolly is made of a rectangular frame supported on four wheels, and an elevating platform that is raised and lowered by means of mechanical jacks positioned at opposite sides of the frame. The dolly is rolled beneath the pool table and the platform is brought into contact with the table by raising each of the jacks. A jack is raised by stepping on an associated lever with a relatively low force and short stroke. The jacks are individually operated by a user so that only a portion of the weight of the table is lifted at a time. Once raised off the floor by the platform, the table may be moved from one place to another.

A drawback of this device is that each of the individual jacks must be separated actuated to bring the platform into contact with the table, and to raise and lower the table. Also, the table is not lifted vertically off the floor. Rather, once the dolly is in place underneath the article, the jacks on one side and then the jacks on the other side are actuated. As a result, the pool table becomes tipped during lifting which makes it unstable on the dolly and may also alter the level of the slate.

Therefore, an object of the invention is to provide an apparatus for moving a heavy article from place to place over a floor surface that is easily and safely operable by a single person. Another object is to provide an apparatus for moving an article that will maintain the article in a stable position while being lifted onto the apparatus and moved. Another object is to provide an apparatus that is portable and detachable from the article being moved.

SUMMARY OF THE INVENTION

These and other objects are achieved by the present invention which is directed to an apparatus for moving an article such as a pool table, vending machine, and the like, from place to place over a floor surface, and a method of moving an article using the apparatus.

The apparatus is made of a pivotally connected planar base and planar platform. The base and platform are made of a generally rectangular-shaped frame oriented in a generally horizontal plane relative the floor. The base includes means for slidably moving the apparatus across the floor.

The apparatus includes means for pivotally connecting the base and platform attached at opposing sides of the apparatus. The pivotal connecting means is operable to raise and lower the platform relative the base to selectively move the apparatus between a retracted position and an elevated position. In the retracted position, the platform is in close proximity to the base with the pivotal connecting means oriented at an acute angle relative the horizontal plane of the base and platform. In the elevated position, the platform is maintained at a distance above the base with the pivotal connecting means oriented at an obtuse angle relative the horizontal plane of the base and the platform.

At one end of the apparatus is attached means for actuating movement of the base and the platform through the pivotal connecting means. The movement actuating means is attached to both the platform and the base, and operable to selectively raise and lower the platform relative the base by moving the pivotal connecting means between its acute angle orientation and its obtuse angle orientation. In a preferred embodiment, the movement actuating means is an L-shaped member attached to an end of both the platform and the base with the lower extension projecting away from the base. The lower extension is preferably adapted for receiving a handle that may be releasibly inserted into or onto the lower extension member, and used for actuating movement of the apparatus to raise and lower the platform and the article to be moved.

In the retracted position, the apparatus is adapted to be positioned underneath the article to be moved which has upstanding support legs. It is understood that the present apparatus may also be used to move an article without legs merely by lifting the article onto the platform. In the elevated position, the platform of the apparatus is adapted for contacting and elevating the article off the floor such that the article may be slidably moved from place to place over the floor surface in a stable manner.

In use, the apparatus in the retracted position is positioned underneath the article to be lifted, and the operator pushes downward on the handle of the movement actuating means to elevate the platform which then contacts the article and raises it off the floor. Additional force is applied to the handle to move platform past the point of being centered over the base and to an at-rest position in which the platform rests upon the end of the connecting member of the pivotal connecting means. The angle of the connecting member between the platform and the base, and the weight of the platform on the connecting member, function together to lock the platform into place in the elevated position. A safety pin may be inserted into an aperture in the bracket member of the base to lock the first extension member of the movement actuating means into a locked position adjacent the end of the base. The handle is then removed and, with the platform locked in the elevated position and the article stably balanced on the platform, the operator pushes the apparatus and the article to the desired location. At the new location, the article is lowered to the floor by reinserting the handle into the movement actuating means and removing the safety pin from the bracket member. The handle is then raised by applying an upward force which causes the platform to be lowered and the article to be placed onto the floor surface. With the apparatus in the retracted position, it may then be pulled out from under the article and used elsewhere.

The present apparatus overcomes the drawbacks of other moving devices through the provision of a lifting device that can be operated by a single person in one movement without assistance from others. The apparatus is useful for moving a variety of articles including, for example, a pool table, vending machine, pinball game table, desk, dining table, dresser, cabinet, credenza, bureau, among other articles. Advantageously, the apparatus vertically lifts the article in one movement and maintains the article on the raised platform in a properly balanced alignment so that the article may be moved by one person from place to place in a stable manner.

BRIEF DESCRIPTION OF THE DRAWINGS

Throughout the following views, reference numerals will be used on the drawings, and like reference numbers will be used throughout the several views and the description to indicate corresponding parts of the invention.

FIG. 4a showing a perspective view; FIG. 4b showing a frontal view.

DETAILED DESCRIPTION OF THE INVENTION

The present invention provides an apparatus for lifting and moving an article such as a pool table, vending machine, pinball game table, among others, from place to place, for example, across a floor or to a different location in a building.

Figure 1:
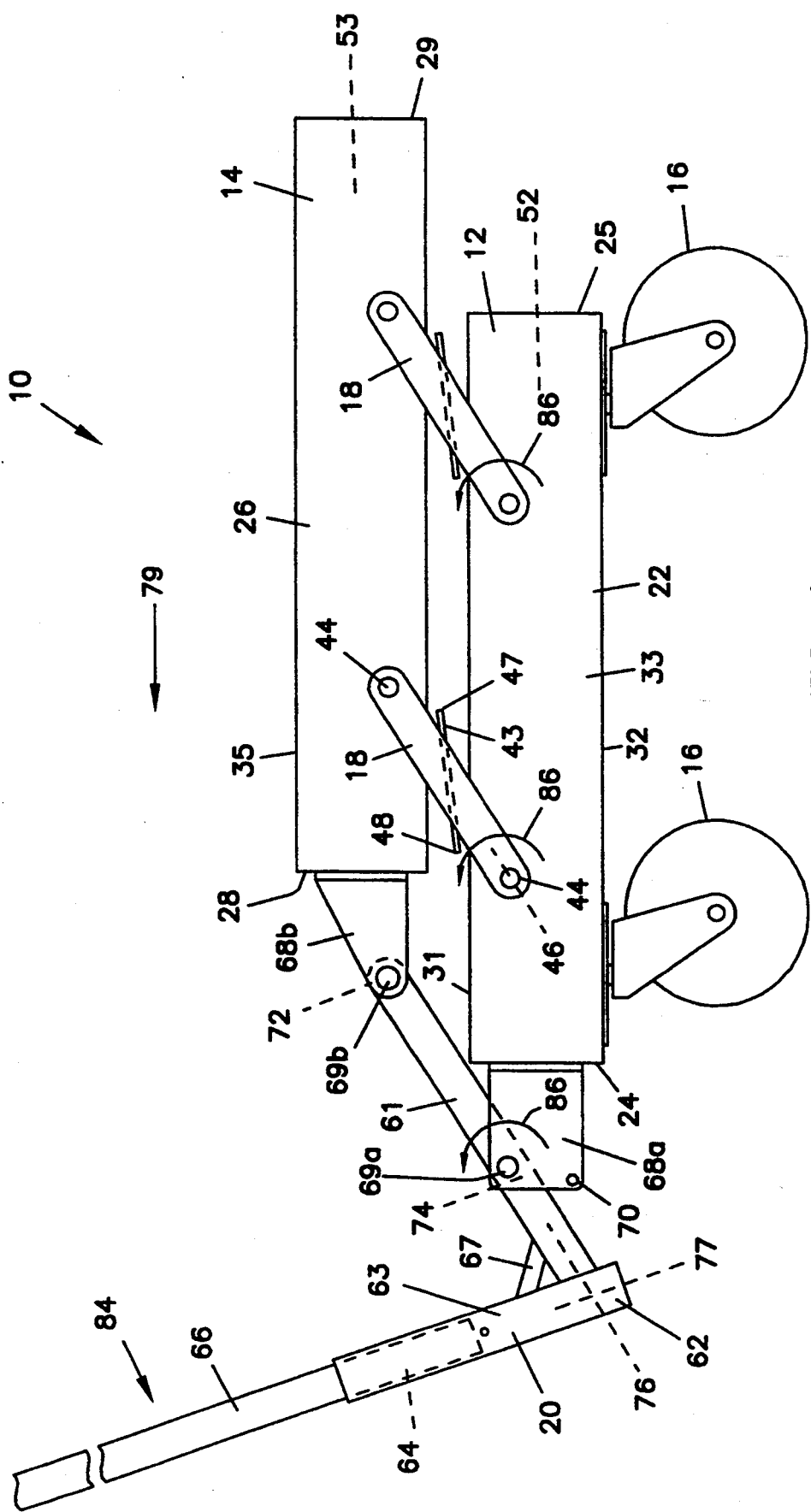
FIG. 1 is a side view of a first embodiment of the apparatus of the invention, shown in the retracted position.
Figure 2:
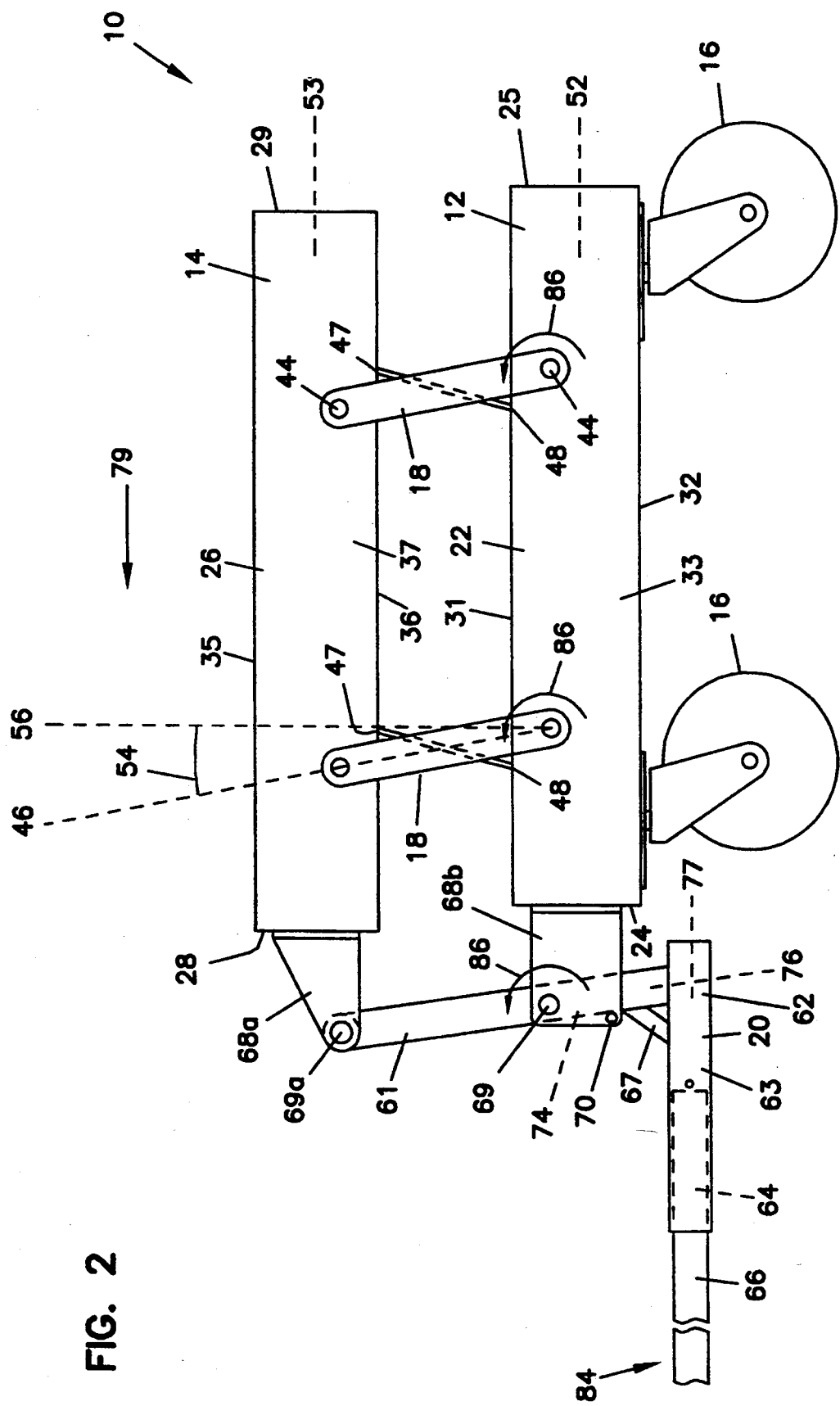
FIG. 2 is a side view of the apparatus of FIG. 1, shown in the elevated position.
Figure 3:
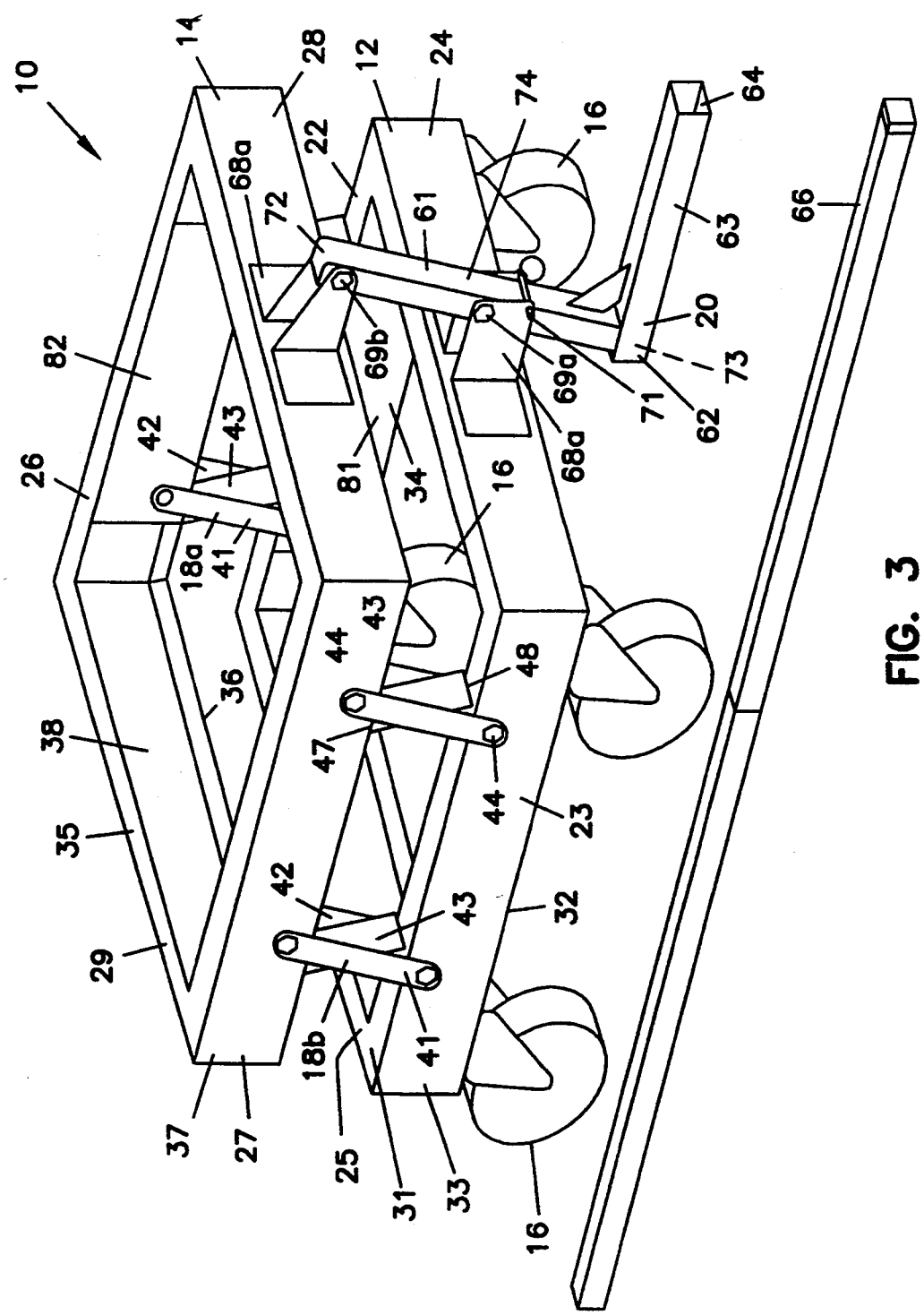
FIG. 3 is a perspective view of the apparatus of FIG. 2, shown in the elevated position.

Referring now to the drawings, FIGS. 1–3 are illustrations of a first embodiment of the apparatus for lifting and moving an article such as a pool table, in accordance with the invention, designated generally by the numeral 10. As shown in FIG. 1, the apparatus is in the retracted position. In general, apparatus 10, includes base 12, platform 14, means 18 for pivotally connecting the base and the platform, means 20 for actuating movement of the pivotal connecting means, and means 16 for slidably moving the apparatus across the floor surface.

Base 12 and platform 14 are generally planar and rectangular in shape. As illustrated in FIG. 3, base 12 and platform 14 are preferably constructed as an open frame. Base 12 includes first and second sides 22,23 in opposing parallel arrangement, and first and second ends 24,25 in opposing parallel arrangement. Platform 14 includes first and second sides 26,27 in opposing parallel arrangement, first and second ends 28,29 in opposing parallel arrangement. The apparatus is constructed such that base 12 and platform 14 are oriented in a generally horizontal plane, 52,53, respectively, relative the floor surface. It is understood that base 12 and platform 14 may also be constructed as a closed box-like frame with a panel (not shown) attached to base 12 along one or both surfaces 31,32, and/or with a panel (not shown) attached to platform 14 along one or both surfaces 35,36.

Base 12 and platform 14 are sized to support the article to be moved in a stable manner. For example, base 12 and platform 14 may be sized to have the same dimensions as illustrated in FIGS. 1–5, or platform 114 may be sized larger than base 112, as shown in FIGS.

6–9 with a length greater than base 112. It is desirable that base 12 and platform 14 are sized about the same to minimize production costs where the article to be moved has a solid base or an underside able to support the article to be lifted such as a pool table, air hockey table, football table, and the like. It is preferred that platform 114 is sized larger than base 112 where the article to be moved requires that platform 114 lifts on a structural member of the article to be moved, or if the weight of the article requires the article to be distributed over a larger area, such as with a vending machine, cigarette machine, pop machine, and the like. Base 12 or 112 may also be sized larger than platform 14 or 114 (not shown).

Base 12 includes means 16 for slidably moving the apparatus from place to place across the floor surface. As shown, slidable moving means 16 are attached to surface 32 of base 12 at each of the four corners to provide maximum stability of apparatus 10 and the article during movement. As few as three slidable moving means 16 may be positioned at any location along base 12 which provides the desired stability to apparatus 10 during use. In general, slidable moving means 16 suitable for use according to the invention are those dimensioned and constructed to support the weight of the article being moved to slidably move the article from one location to another. Examples of such slidable moving means 24 include wheels, casters, rollers, skids and the like. Preferably, slidable moving means 16 is detachable from base 12. Optionally, apparatus 10 may include means (not shown) for locking slidable moving means 16 to prevent movement and maintain apparatus 10 at a substantially stationary location on the floor.

Figure 4D:
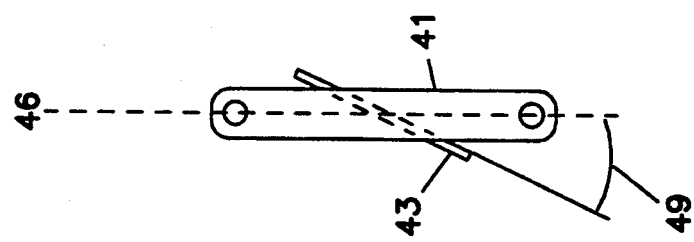
FIG. 4d showing a side view depicting axis 46 and angle 49.
Figure 4C:
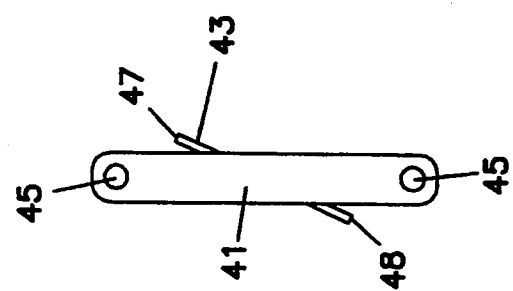
FIG. 4c showing a side view.
Figure 4B:
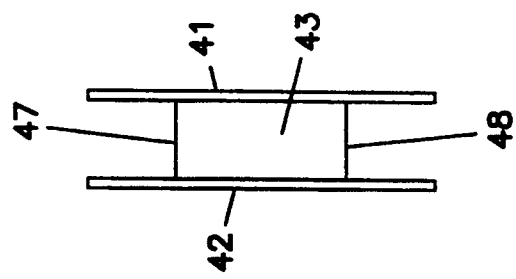
FIGS. 4a–4b are various views of an embodiment of a pivotal connecting means.
Figure 4A:
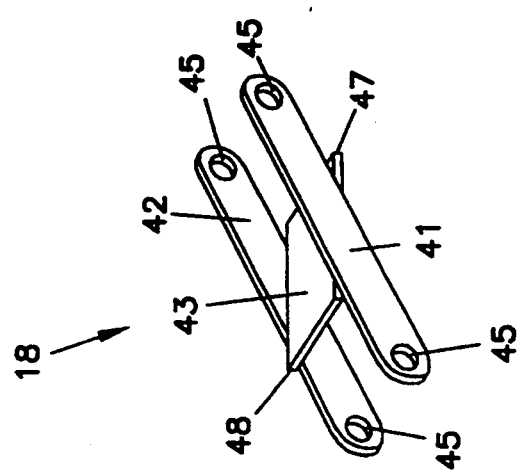

Platform 14 is connected to base 12 by a plurality of pivotal connecting means 18. As shown in FIGS. 4a–4d, pivotal connecting means 18 is made of oppositely disposed first and second members 41,42 in opposing parallel arrangement being coupled together by connecting member 43. As shown in FIG. 4l–4d, connecting member 43 is a plate-like member oriented at an angle 49 relative longitudinal axis 46 of members 41,42. Apertures 45 provided in members 41,42, are adapted for receiving means 44 for pivotal attachment of pivotal connecting means 18 to apparatus 20, for example, bolts, pins, and the like, as shown in FIG. 1.

Pivotal connecting means 18 are attached to both base 12 and platform 14. Preferably, apparatus 10 includes four pivotal connecting means 18 attached to sides 22,23 of base 12 and sides 26, 27 of platform 14 to provide an eight-point suspension of platform 14 in the elevated and at-rest position above base 12. Pivotal connecting means 18 are suitably dimensioned and constructed of a suitably strong and rigid material such as steel, aluminum, steel casting and the like, to effectively raise and lower platform 14 relative base 12, and to stably support platform 14 and the lifted article above base 12 during use of apparatus 10 to move the article. As shown in FIG. 3, pivotal connecting means 18a is attached to first sides 22,26 of base 12 and platform 14, respectively, and pivotal connecting means 18b is attached to second sides 23,27 of base 12 and platform 14, respectively. More particularly, member 41 of pivotal connecting means 18 is secured to outer surfaces 33,37 of base 12 and platform 14, and member 42 is attached to inner surfaces 34,38 of base 12 and platform 14, respectively.

As shown in FIGS. 1–3, movement actuating means 20 is an L-shaped member made of first (upper) extension member 61 and second (lower) extension member 63. Movement actuating means 20 may be formed as a single construction or by welding or otherwise fastening together first extension member 61 to second extension member 63 at junction 62 at an about perpendicular angle. Optionally, reinforcing member 67 may be attached to first extension member 61 and second extension member 63 to provide additional structural support at junction 62.

First extension member 61 is pivotally attached to clasp-like bracket members 68a,68b secured to ends 24,28 of base 12 and platform 14, respectively, for example, by bolts, adhesive, welding, and the like. In particular, extension member 61 is pivotally attached at first end 72 to bracket member 68b and at about position 74, which is beyond the midpoint of extension 61 toward second end 73, to bracket member 68a on base 12. Such pivotal attachment of first extension member 61 may be achieved by any suitable means such as bolts, pins, and the like, that will allow first extension member 61 to pivot about pivotal attachment means 69a,69b. Bracket member 68a on base 12 also includes aperture 70 for removably receiving pin 71, or the like, for maintaining first extension member 61 in a locked position when apparatus 10 is elevated and platform 14 is in the at-rest position, as shown in FIGS. 2 and 3. This inhibits movement of movement actuating means 20 and platform 14 when apparatus 10 is elevated and is in use.

Second (lower) extension 63 includes means 64 for receiving a rod-like handle 66. As shown, handle receiving means 64 is adapted to receive handle 66 by insertion of handle 66 into handle receiving means 64, but can also be adapted for external attachment of handle 66. The combination of movement actuating means 20 with handle 66, and its pivotal attachment to apparatus 10, is used to actuate simultaneous movement of base 12, platform 14 and pivotal connecting means 18 which in turn causes platform 14 to be selectively raised and lowered relative base 12 to place apparatus 10 in an elevated or retracted position. It is preferred that the length of handle 66 is suitable for actuating apparatus 10 by a person standing upright on the floor, without the need for positioning himself underneath the object and risking possible injury.

Apparatus 10 is preferably composed of steel, but may also be constructed of wood, aluminum, composite material such as graphite polymer and the like, steel tubing, or other rigid material capable of supporting the article to be lifted.

To assemble apparatus 10, base 12 and platform 14 as shown in FIGS. 1–3, may be fabricated by bending a sheet of steel (80×6.5×12 gauge) into a U-shaped strip and then into a rectangular shape, cutting away excess material at each of the four corners, and closing the open corners using conventional steel fastening techniques. While this construction technique is preferred, other similar metalworking techniques would be sufficient. Although a rectangular-shaped base and platform are preferred, it is understood that base 12 and platform 14 may be of any desired shape, including for example, square, circular, oval, triangular, among others. As shown in FIG. 3, to reinforce the attachment of pivotal connecting means 18, plate members 81,82 are optionally, but preferably, attached to inner surface 34 of opposing sides 22,23 of base 12, and inner surface 38 of opposing sides 26,27 of platform 14 by conventional steel fastening techniques. It is preferred that pivotal connecting means 18 is made of a rigid material such as wood, aluminum, composite material, steel tubing, and the like.

Pivotal connecting means 18 are attached to base 12 and platform 18 by means of bolts or other connecting means 44 that allow for pivotal movement. Pivotal connecting means 18 are positioned along the sides of base 12 and platform 14 such that, when apparatus 10 is in the elevated position, edges 47,48 of connecting member 43 come into contact with surfaces 31,36, respectively of base 12 and platform 14, and platform 14 is maintained in a horizontal plane 53 above base 12 and the article is supported in a stable manner without tipping.

Bracket members 68a,68b are attached to ends 24,28 of base 12 and platform 14. First extension member 61 of movement actuating means 20 is then attached to bracket members 68a,68b by bolts or other pivotal attachment means 69a,69b. Finally, casters or other slidable moving means 16 are attached to base 12, preferably using a releasable attachment, by methods known and used in the art.

Referring now to FIG. 1, in use, apparatus 10 in the retracted position is positioned underneath the article to be lifted. In the retracted position, platform 14 is in close proximity to or resting on base 12. Axis 46 of pivotal connecting means 18, and axis 76 of extension member 61 of movement actuating means 20, are oriented at an acute angle to the horizontal planes 52,53 of base 12 and platform 14 and the floor surface. As shown in FIGS. 1–3, extension member 63 of movement actuating means 20 is positioned at a slightly acute angle to extension member 61. As such, when extension member 61 is locked in position in bracket member 68a, axis 77 of extension member 63 is maintained at an angle slightly above the horizontal plane of the floor, preferably at about 3°–15° above the horizontal, preferably at about 5°–10°. This, in turn, helps prevent handle 66 from coming into contact with the floor and catching the fingers of the operator between handle 66 and the floor. Optionally, handle 66 may also be fabricated to include a slight bend, for example, near where it is attached to receiving means 64, at or about the end held by the operator, or at a point thereinbetween.

Figure 5:
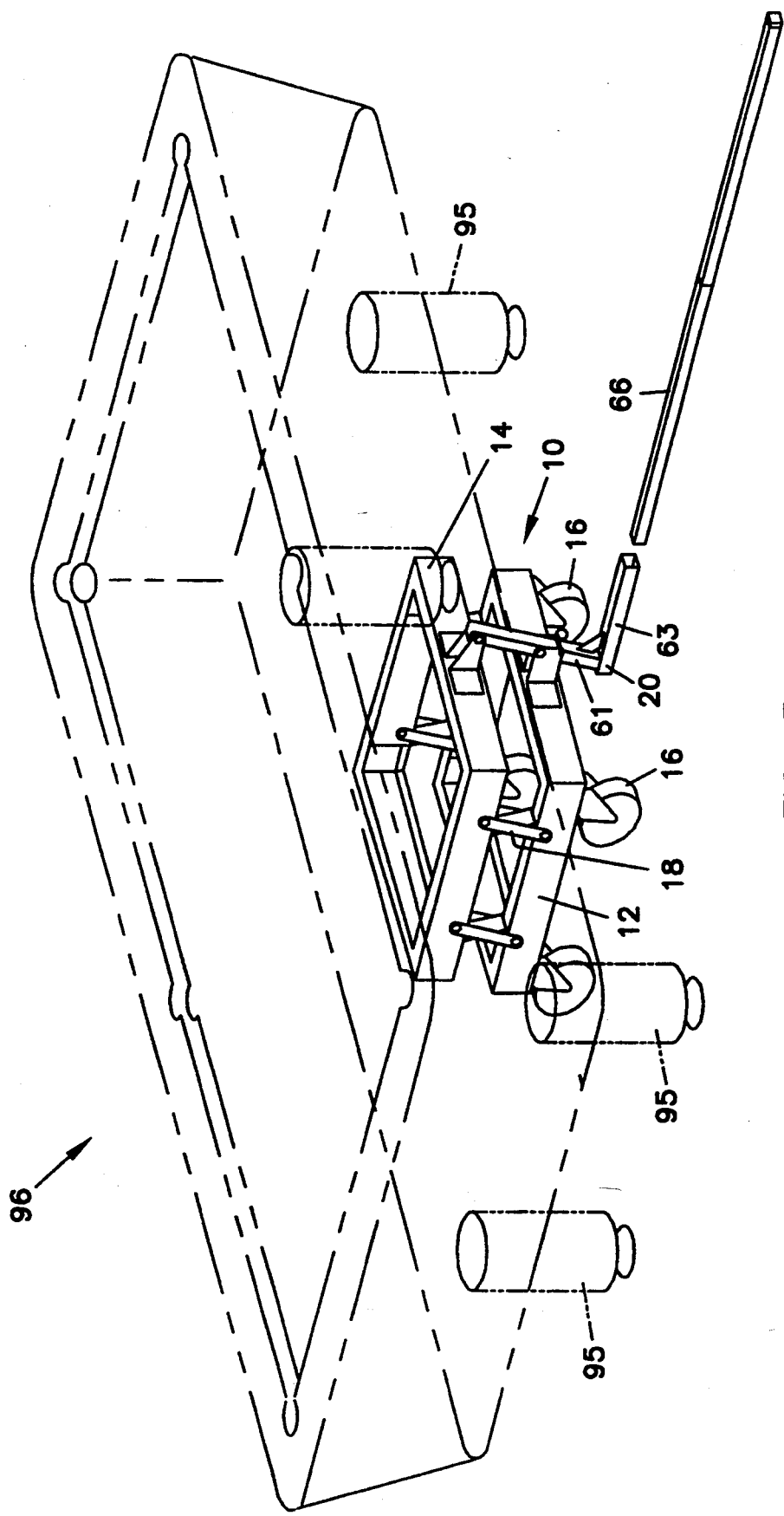
FIG. 5 is a perspective view of the apparatus of FIGS. 1–3 in use in the elevated position, with a pool table shown in phantom.

Once placed at the desired location underneath the article, the operator raises platform 14 into contact with the underside of the article by exerting a downward force onto handle 66 in the direction of arrow 84. This causes first extension member 61 to pivot about its connection at 69a,69b to bracket members 68a,68b, and pivotal connecting means 18 to pivot about connections at 44, in the direction of arrow 86. Simultaneously, platform 14 is drawn in the direction of arrow 79 and raised away from base 12, as shown in FIG. 2. As platform 14 is raised, it comes into contact with and lifts article 96 vertically so that feet 95 are no longer in contact with the floor, as shown in FIG. 5. Referring again to FIG. 2, further downward force on handle 66 in the direction of arrow 84 causes first extension member 61 and pivotal connecting means 18 to further pivot around connecting members 69a,69b and 44, respectively, in the direction of arrow 86, until platform 14 is raised to a maximum distance from base 12, and then slightly lowered to an at-rest elevated position such that connecting member 43 of pivotal connecting means 18 becomes essentially locked into position between platform 14 and base 12, and platform 14 becomes a solid, stable support rigidly held in the raised position above base 12.

With apparatus 10 in the position as shown in FIG. 2, pivotal connecting means 18 are oriented at an obtuse angle with axis 46 oriented at an angle 54 which is past the vertical plane 56 to horizontal planes 52,53 of base 12 and platform 14, respectively. In that position, connecting member 43 is oriented at an about 70°–80° angle past a vertical plane and positioned such that edges 47,48 are in contact with first (upper) surface 31 of base 12 and second (lower) surface 36 of platform 14. As such, connecting member 43 functions to limit the extent of travel of pivotal connecting means 18 when apparatus 10 is selectively moved from the retracted to the elevated position. In the elevated, at-rest position, platform 14 settles down upon edge 47 of connecting member 43 and places force upon edge 48 in contact with base 12 which locks connecting member 43 into place between base 12 and platform 14. In a preferred embodiment, apparatus 10 includes four pivotal connecting means 18 to provide a eight-point suspension of platform 14 in the elevated, at-rest position above base 12. This positioning of connecting member 43 in contact with base 12 and platform 14, and the force placed upon connecting member 43, absent a large counterforce, helps prevent slippage or other movement of raised platform 14 during use, and helps stabilize and maintain platform 14 and the article in the raised position. Preferably, connecting member 43 is oriented at about 25° in relation to the center line of members 41 and 42 to provide maximum clearance when in the retracted position and to provide maximum support when in the elevated position. This allows pivotal connecting means 18 to rotate approximately 1°–20° past vertical to come to rest at an about 70°–80° angle in relation to the parallel planes 52 and 53.

As depicted in FIG. 3, for additional security against movement of platform 14, pin 71 may be inserted into aperture 70 of bracket member 68a to maintain extension member 61 in a locked position while apparatus 10 is in the elevated position. The user then removes handle 66 from apparatus 10, and moves apparatus 10 and the article to a new location.

When the article is properly positioned, the article are lowered to the floor. To do so, handle 66 is reinserted into handle receiving means 64 of movement actuating means 20, and pin 71 is removed from aperture 70 of bracket member 68a. Handle 66 is then raised by applying an upward force opposite the direction of arrow 84. This causes first extension member 61 and pivotal connecting means 18 to pivot in a direction opposite arrow 86, which in turn causes platform 14 to be lowered to its starting position as shown in FIG. 1, and the article to be placed onto the floor surface. Apparatus 10 may then be pulled out from under the article and used elsewhere.

A single apparatus 10 is adapted to lift and move an article such as a pool table 96 that weighs about 450–1200 lbs, preferably about 600–800 lbs. To lift a typical pool table of about 600–800 lbs using apparatus 10, about 50 lbs of downward force on the handle is required. For larger and/or heavier articles, it is preferred that two apparati according to the invention are strategically positioned underneath the article, for example, one apparatus at each end of the article.

In a preferred embodiment, apparatus 10 for moving an about 92"×54"×32" (l×w×h) pool table of about 600–800 lbs would be constructed out of about 12 gauge steel sheeting, with each of base 12 and platform 14 about 20"×20"×3.5"×1⅜" (l×w×h×breadth); pivotal connecting means 18, about 7"×1"×2" (l×w×b) with each of members 41,42 about 7"×1"×10 gauge and connecting member 43, about 3.875"×1.75"×10 gauge; movement actuating means 20 with first (upper) extension member 61, about 10"×1"×1", second (lower) extension member 63, about 8"×1.25"×1.25", and handle 66, about 48"×1"×1". Such a pool table-moving apparatus 10 would be about 13½" in height when in the retracted position and about 16¾" in height when in the extended position. Apparatus 10 is relatively light in weight, preferably about 50–60 lbs. Preferably, apparatus 10 may be lifted and carried by 1–2 persons.

A second embodiment of the apparatus of the invention is shown in FIGS. 6–9, and designated generally as 110, is designed for moving a vending machine or other like article having a low clearance height with upright legs of about 5½ to about 7½ inches.

Figure 7:
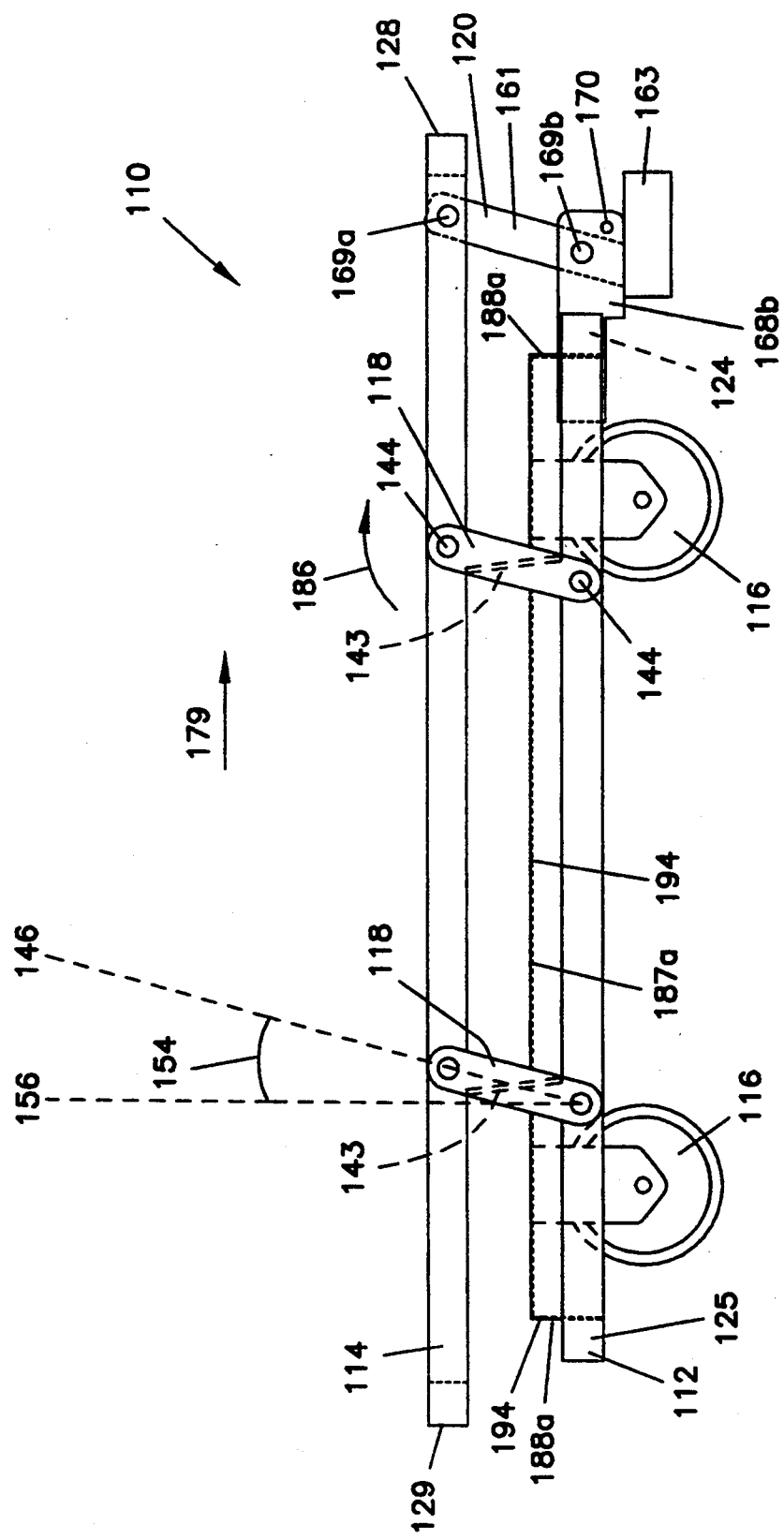
FIG. 7 is a side view of the apparatus of FIG. 6, shown in the elevated position.
Figure 8:
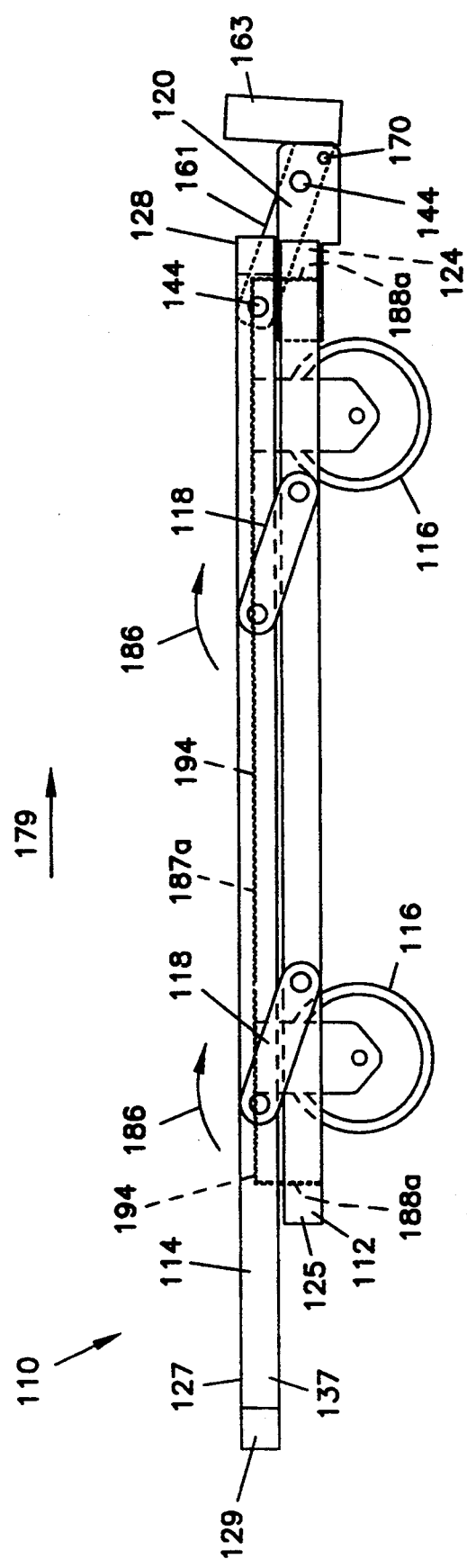
FIG. 8 is a side view of the apparatus of FIG. 6, shown in the retracted position.

Like apparatus 10, apparatus 110 includes base 112, platform 114, means 118 for pivotally connecting the base and the platform, means 120 for actuating movement of the pivotal connecting means, and means 116 for slidably moving the apparatus across the floor surface. To facilitate placement of apparatus 110 underneath a vending machine having low floor clearance, the overall height of apparatus 110 and various components are reduced in size. In a preferred embodiment of apparatus 110 for moving a vending machine with a base to floor clearance of about 5.5–7 inches, the height of each of base 112 and platform 114 is about 1-inch rather than 3½ inches as in base 12 and platform 14, the pivotal connecting means 118 are shortened from 7 inches to about 4.5 inches, and the size of the casters or other slidable moving means 116 are reduced from 5 inches to about 4 inches. Also, the mounting of slidable moving means 116 may be offset, for example, by means 194 for insetting slidable moving means 116 for example as a steel box as depicted in FIGS. 6–8.

Figure 6:
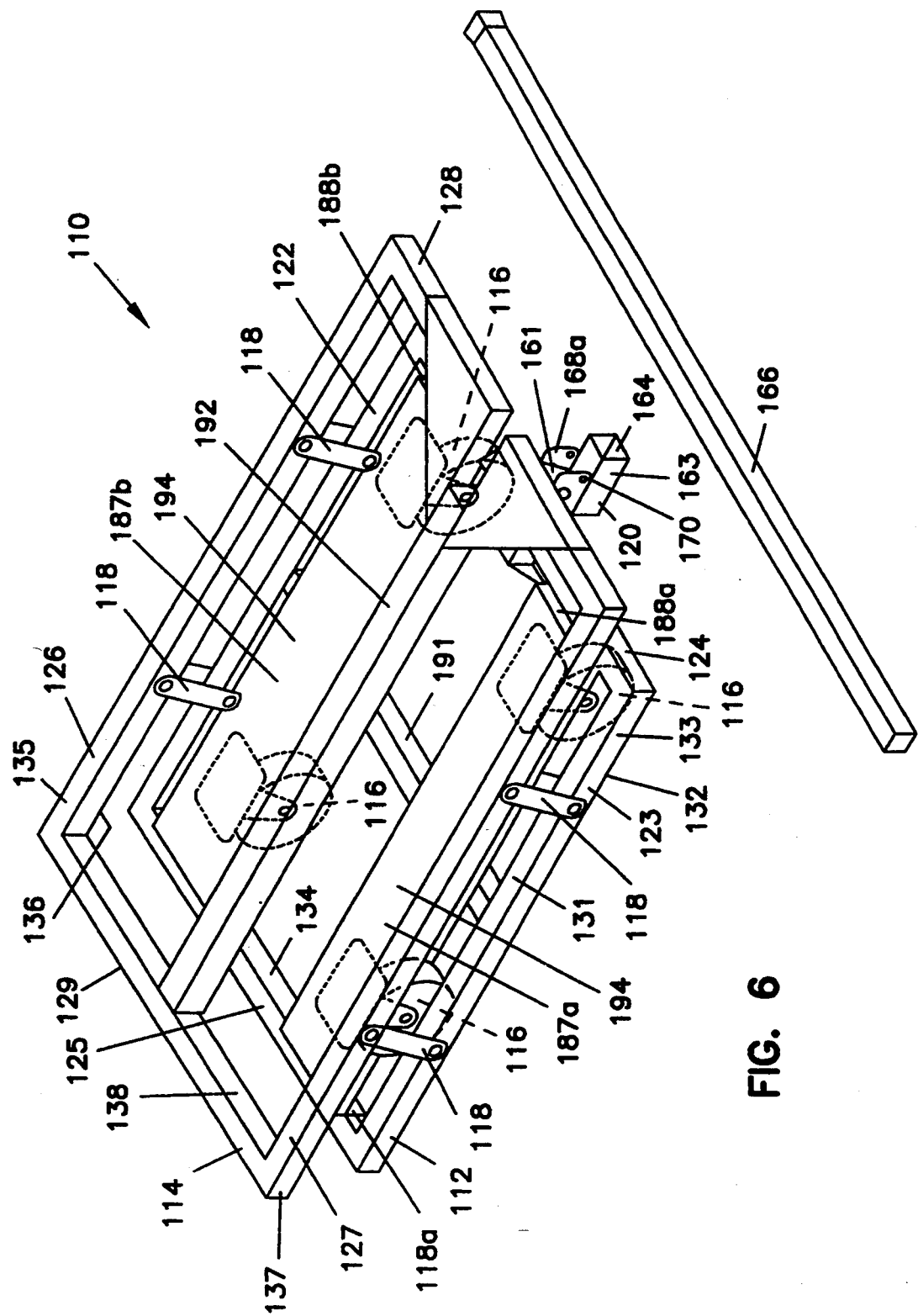
FIG. 6 is a perspective view of a second embodiment of the apparatus of the invention, shown in the retracted position.

As depicted in FIG. 6, apparatus 110 is shown as including cross member 191 connected to sides 122,123 of base 112, and cross member 192 connected to ends 128,129 of platform 114. Base 112 is further shown as including insetting means 194a,194b with plate members 187a,187b and end members 188a,188b. Insetting means 194a,194b are each connected to ends 124,125. Slidable moving means 116, preferably in the form of casters, are mounted on plate members, 187a,188b, as illustrated in FIGS. 6–8. Cross members 191,192 and insetting means 194 are attached to base 112 and/or platform 114 by conventional metal fastening techniques such as welding, gluing, riveting, or the like.

In a preferred embodiment, apparatus 110 for moving an about 70"×38"×30" vending machine of about 700–800 lbs would be constructed of about 0.083" wall thickness, 1'×1" square tubing, with base 112, about 26"×22"×1"×1" (l×w×h×b); platform 114, about 32"×22"×1"×1"; pivotal connecting means 118, about 4.5"×1"×1.375" (l×w×b) with each of members 141,142, about 4.5"×1"×⅛–2/8"; movement actuating means 120 with first (upper) extension member 161, about 5"×1"×1" (⅛–2/8 thickness), second (lower) extension member 163, about 3"×1½"×1½", and handle 166, about 38"×1"×1". A preferred vending machine-moving apparatus 110 would be about 5⅝" in height when in the retracted position and about 7⅝" in height when in the extended position. Apparatus 110 is relatively light in weight, preferably about 40–50 lbs.

Figure 9:
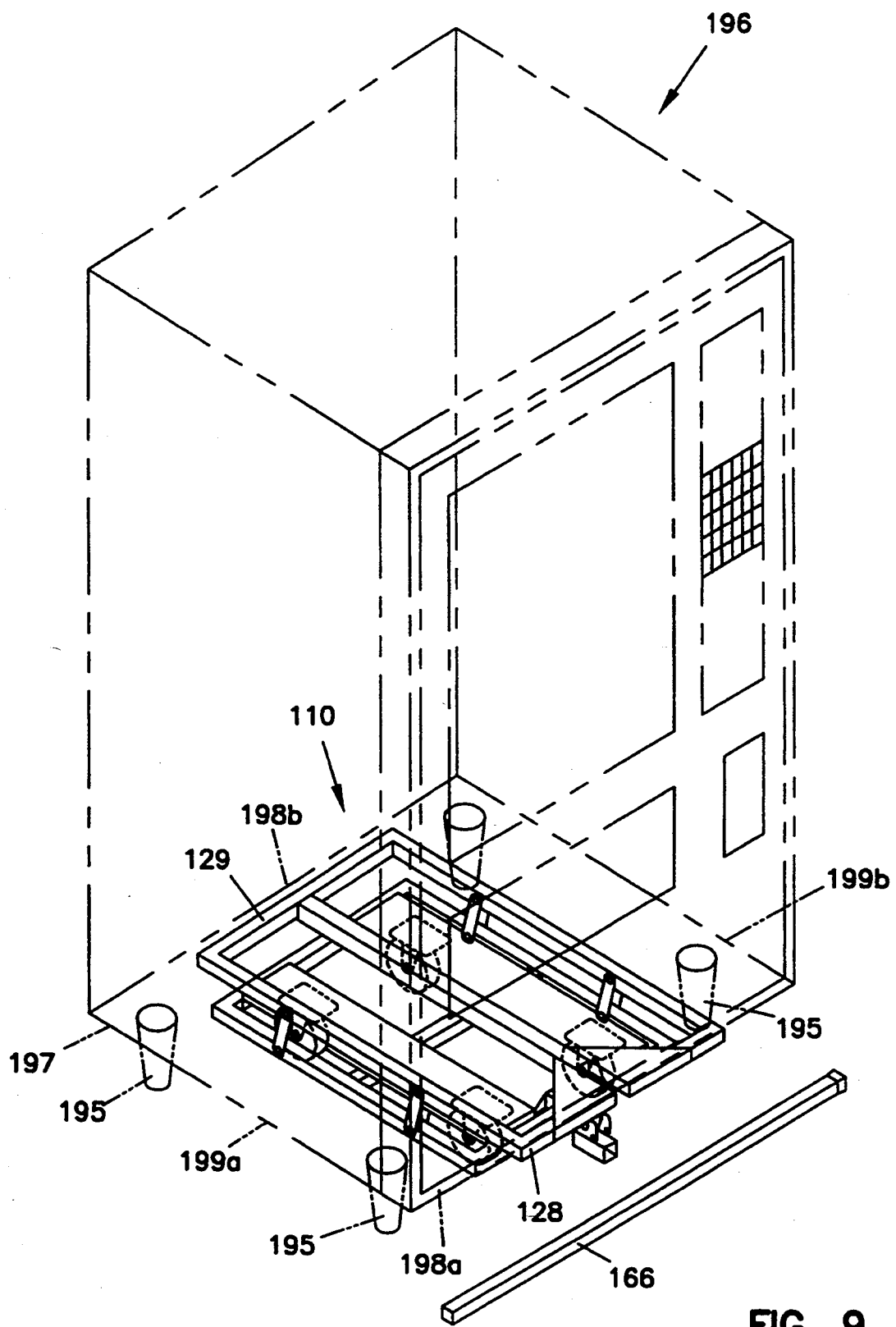
FIG. 9 is a perspective view of the apparatus of FIG. 6 in use in the elevated position, with a vending machine shown in phantom.

To move an article such as a vending machine that has a height greater than its width or length, platform 114 is preferably sized with a length and/or width greater than base 112, such that, when vending machine 196 rests upon platform 114, ends 128,129 of platform 114 are in contact with the edge of opposing sides 198a,b of base 197 of vending machine 196, as shown in FIG. 9. This contact between platform 114 and sides 198a,b of base 197 helps maintain vending machine 196 in a stable position on apparatus 110 during moving.

In use, as with apparatus 10, apparatus 110 in the retracted position is slid underneath vending machine, designated generally as 196, or other like article, as shown in FIG. 9. The operator then pushes down on handle 166 to elevate platform 114 in contact with the underside of vending machine 196, to raise vending machine 196 so that feet 195 are no longer in contact with the floor, and to position platform 114 in the at-rest position. A pin (not shown) is then inserted into aperture 170 of bracket member 168a to lock first extension member 161 in place adjacent to base 112. The operator then moves apparatus 110 with the article thereon to the desired location.

Advantageously, the apparatus of the present invention provides vertical lifting of a pool table, vending machine or other article which eliminates damage caused to the article or the floor from dragging the legs and adjustable feet across the floor, or tipping or dropping of the article. Because the legs of the article do not contact the floor during the move, use of the present apparatus also eliminates the need for re-leveling adjustable feet such as those found with a pool table or vending machine. In addition, the present apparatus eliminates problems with balancing and moving an article such as a pool table or pinball game table, as found with other mechanical devices that use a plate attached to a jack. Also, the present apparatus is relatively light and portable, and can be shipped cross-country via normal courier service. Also, since the apparatus is not permanently attached to the article to be moved, it can be used for moving several articles at one location.

Thus, the invention has been described with reference to various specific and preferred embodiments and techniques. However, it should be understood that many variations and modifications may be made while remaining within the spirit and scope of the invention, and the invention is not to be construed as limited to the specific embodiments shown in the drawings.

What is claimed:

1. An apparatus for moving an article over a floor surface, comprising:

a planar base and a planar platform oriented in a generally horizontal plane relative the floor surface, the base and the platform each having a generally rectangular shape with a first side and a second side in opposing parallel arrangement, and a first and a second end in opposing parallel arrangement;

the base including means for slidably moving the apparatus across the floor surface;

means for pivotally connecting the base and the platform, a first pivotal connecting means pivotally attached to the first sides of the base and the platform, and a second pivotal connecting means pivotally attached to the second sides of the base and the platform; wherein the pivotal connecting means comprises a first member and a second member each with a longitudinal axis in opposing parallel arrangement, and a connecting member therein between oriented at an acute angle to said longitudinal axis; wherein said connecting member has a first end and a second end;

the pivotal connecting means being operable to pivot about their attachment to the base and the platform to raise and lower the platform relative the base, wherein when the apparatus is in a retracted position, the platform is in close proximity to the base and the pivotal connecting means are oriented at an acute angle relative the horizontal plane of the base and platform; and when the apparatus is in an elevated position, the platform is distant from the base and the pivotal connecting means are oriented at an obtuse angle relative said horizontal plane; and means for actuating movement of the pivotal connecting means pivotally attached to the first ends of the base and the platform; the movement actuating means being operable to pivot the pivotal connecting means about their attachment to the base and the platform between said acute angle orientation and said obtuse angle orientation to selectively raise and lower the platform to move the apparatus between said retracted position and said elevated position;

the apparatus in said retracted position being adapted for positioning underneath the article, and the apparatus in the elevated position being adapted for contacting and raising the article, wherein the article can be slidably conveyed over the floor surface in a stable manner;

wherein, when the apparatus is in the elevated position, the pivotal connecting means is oriented at said obtuse angle with the connecting member oriented past vertical; the first end of the connecting member in contact with the platform and the second end of the connecting member in contact with the base; the connecting member being operable to maintain the platform in a stationary elevated position.

2. The apparatus according to claim 1, wherein the slidable conveying means are casters, wheels or rollers.

3. The apparatus according to claim 2, wherein the slidable conveying means are releasibly attached to the base.

4. The apparatus according to claim 1, wherein the apparatus is composed of metal, wood, plastic, or a composite material.

5. The apparatus according to claim 1, wherein the platform has a length greater than the base.

6. The apparatus according to claim 1, wherein the movement actuating means comprises an L-shaped member having a first extension member and a second extension member; the first extension member being pivotally attached to the first ends of the platform and the base; and the second extension member including means for receiving a handle and being oriented at an angle about perpendicular to the first extension.

7. The apparatus according to claim 6, wherein the movement actuating means further comprises a handle.

8. A method for moving an article across a floor surface, comprising:

(a) providing an apparatus for moving an article over a floor surface, the apparatus comprising:

a planar base and a planar platform oriented in a generally horizontal plane relative the floor surface, the base and the platform each having a generally rectangular shape with a first side and a second side in opposing parallel arrangement, and a first and a second end in opposing parallel arrangement;

the base including means for slidably moving the apparatus across the floor surface;

means for pivotally connecting the base and the platform, a first pivotal connecting means pivotally attached to the first sides of the base and the platform, and a second pivotal connecting means pivotally attached to the second sides of the base and the platform; wherein the pivotal connecting means comprises a first member and a second member each with a longitudinal axis in opposing parallel arrangement, and a connecting member therein between oriented at an acute angle to said longitudinal axis; wherein said connecting member has a first end and a second end;

the pivotal connecting means being operable to pivot about their attachment to the base and the platform to raise and lower the platform relative the base, wherein when the apparatus is in a retracted position, the platform is in close proximity to the base and the pivotal connecting means are oriented at an acute angle relative the horizontal plane of the base and platform; and when the apparatus is in an elevated position, the platform is distant from the base and the pivotal connecting means are oriented at an obtuse angle relative said horizontal plane; and means for actuating movement of the pivotal connecting means pivotally attached to the first ends of the base and the platform; the movement actuating means being operable to pivot the pivotal connecting means about their attachment to the base and the platform between said acute angle orientation and said obtuse angle orientation to selectively raise and lower the platform to move the apparatus between said retracted position and said elevated position;

the apparatus in said retracted position being adapted for positioning underneath the article, and the apparatus in the elevated position being adapted for contacting and raising the article, wherein the article can be slidably conveyed over the floor surface in a stable manner;

wherein, when the apparatus is in the elevated position, the pivotal connecting means is oriented at said obtuse angle with the connecting member oriented past vertical; the first end of the connecting member in contact with the platform and the second end of the connecting member in contact with the base; the connecting member being operable to maintain the platform in a stationary elevated position;

(b) positioning said apparatus underneath the article wherein the apparatus is in the retracted position;

(c) actuating the movement actuating means to move the apparatus from the retracted position into the elevated position wherein the platform is placed into contact with the article, the article is raised off the floor surface, and the platform is placed into an at-rest position;

(d) moving the apparatus and the article over the floor surface.

9. The method according to claim 8, wherein the movement actuating means is attached to a bracket member on each of the base and the platform, the bracket member of the base including an aperture for removably receiving a pin; wherein the method further comprises inserting the pin into the aperture to lock the first extension member of the movement actuating means into place adjacent the base.

10. The method according to claim 9, wherein the actuating step (c) comprises:
  (i) applying a downward force onto the handle of the movement actuating means wherein the first extension member pivots about the pivotal attachments to the bracket members and the pivotal connecting means pivot about the pivotal attachments to the base and the platform, whereby the platform is moved to a raised position above the base to contact and lift the article;
  (ii) applying further downward force onto the handle to further pivot the first extension member and the pivotal connecting means to raise the platform to a maximum distance from the base, and to lower the platform to an at-rest elevated position, whereby the pivotal connecting means is oriented at said obtuse angle with the first end of the connecting member in contact with the platform and the second end of the connecting member in contact with the base; the connecting members being operable to maintain the platform in a stationary elevated position.

11. The method according to claim 8, further comprising:
  (e) actuating the movement actuating means to lower the apparatus from the elevated position to the retracted position to place the article onto the floor surface; and
  (f) removing the apparatus from underneath the article.

12. The method according to claim 11, wherein actuating step (e) comprises applying an upward force onto the handle of the movement actuating means wherein the first extension member pivots about the pivotal attachments to the bracket member and the pivotal connecting means pivot about the pivotal attachments to the base and the platform, whereby the platform is moved backward to a lowered position in close proximity to the base, and the article is placed into contact with the floor surface.

* * * * *